Figure 1:
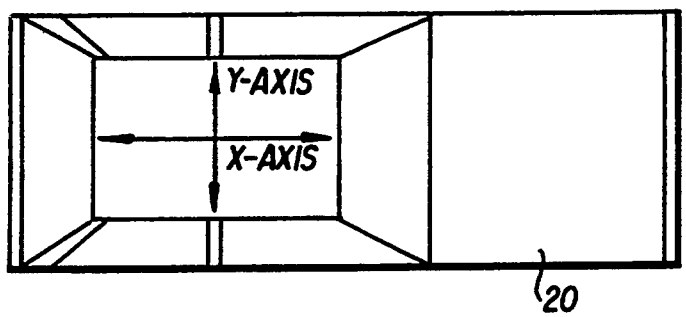

United States Patent [19]

Pineroli et al.

[11] Patent Number: 5,435,184

[45] Date of Patent: Jul. 25, 1995

[54] DEVICE FOR DETERMINING RUNNING VARIABLES IN A MOTOR VEHICLE

[76] Inventors: Bruno Pineroli, Hadlaubstrasse 26, 8044 Zurich; Thomas Junker, Hauptstrasse 49, 4853 Muehldorf; Edouard Vonwyl, Wassergasse 10, 4500 Solothurn, all of Switzerland

[21] Appl. No.: 81,282

[22] PCT Filed: Oct. 29, 1992

[86] PCT No.: PCT/CH92/00221

§ 371 Date: Jun. 30, 1993

§ 102(e) Date: Jun. 30, 1993

[87] PCT Pub. No.: WO93/09008

PCT Pub. Date: May 13, 1993

[30] Foreign Application Priority Data

Oct. 31, 1991 [CH] Switzerland .................. 03181/91

[51] Int. Cl.⁶ .................................................. G01F 15/00
[52] U.S. Cl. ........................................................ 73/489
[58] Field of Search ............. 73/489, 495, 510, 517 R; 310/319; 346/7

[56] References Cited

U.S. PATENT DOCUMENTS

| | | | |
|---|---|---|---|
| 3,713,343 | 1/1973 | Segerdahl et al. | 73/517 R |
| 4,101,869 | 7/1978 | Henderson | 340/52 R |
| 4,114,450 | 9/1978 | Shulman et al. | 73/489 |
| 4,460,902 | 7/1984 | Beckman | 346/7 |

FOREIGN PATENT DOCUMENTS 3920091 10/1990 Germany .
WO89/11986 12/1989 WIPO .

*Primary Examiner*—Robert Raevis
*Attorney, Agent, or Firm*—Wigman, Cohen, Leitner & Myers

[57] ABSTRACT

A device for detecting running variables in a motor vehicle comprises at least two acceleration sensors to detect the longitudinal and transverse acceleration of the motor vehicle, an evaluation circuit with a resettable time measuring unit which determines acceleration values from the sensor signals over a given period of time, a signal divider connected to the signal output of each acceleration sensor to divide the sensor signal into a low-frequency signal component, an adder connected to the LF outputs of the signal dividers for the vectorial addition of the LF components of both sensor signals corresponding to the longitudinal and transverse acceleration components, a storage unit connected to the adder and the time measuring unit to store the calculated acceleration values over the measured time and a control unit connected to the HF outputs of the signal dividers to control the time measuring unit.

18 Claims, 2 Drawing Sheets

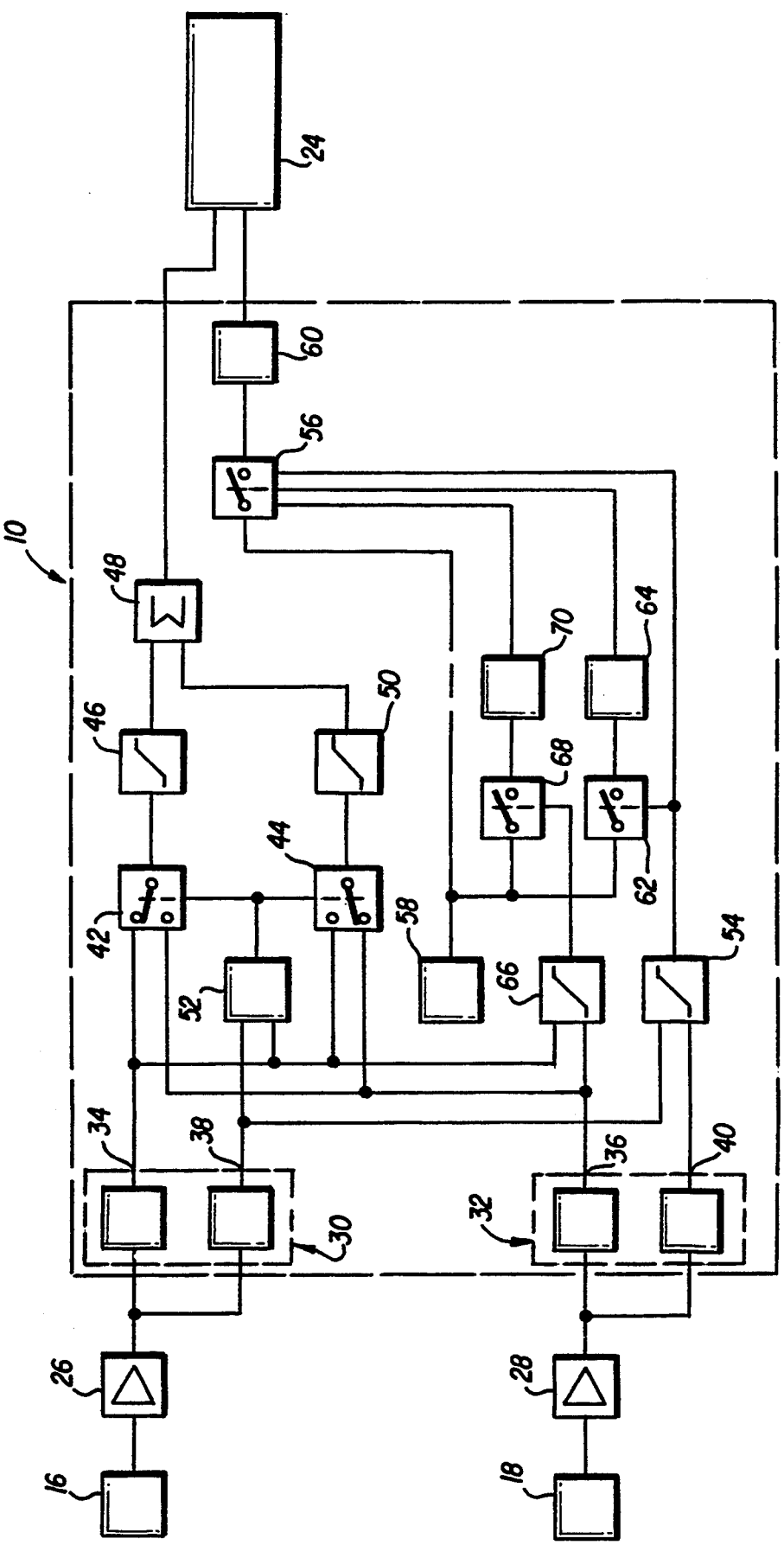

DEVICE FOR DETERMINING RUNNING VARIABLES IN A MOTOR VEHICLE

The invention relates to a device for determining running variables in a motor vehicle, comprising at least two acceleration sensors to determine the longitudinal and transverse acceleration of the motor vehicle and an evaluation circuit with a resettable time measuring unit which determines acceleration values from the sensor signals over a given period of time.

A device of the above-mentioned type is disclosed, for example, in DE-A-39 20 091. Like many other devices of this type, the device described there serves for triggering safety functions in the motor vehicle with the occurrence of certain acceleration values or a certain combination of acceleration values. Such safety functions are, for example, the lighting up of a warning lamp, the positioning of a roll bar, the activation of a belt tightener and/or of an air bag, etc. The common feature of all these devices is that they are, as a rule, integrated in the vehicle.

It is the object of the invention to provide a simple and economical device of the type stated at the outset which is vehicle-independent and can also be retrofitted to any vehicle and which nevertheless operates independently of actuation by the driver.

In order to achieve this object, the device stated at the outset comprises, according to the invention, a signal divider connected to the signal output of each acceleration sensor to divide the particular sensor signal into a low-frequency signal component (LF component) characterizing the vehicle acceleration and a high-frequency signal component (HF component), an adder connected to the LF output of the signal dividers for the vectorial addition of the LF components corresponding to the longitudinal acceleration components and to the transverse acceleration components, a storage unit connected to the adder and the time measuring unit to store the calculated acceleration values over the measured time and a control unit connected to the HF outputs of the signal dividers to control the time measuring unit.

The HF component of the sensor signals detects vibrations of the motor vehicle and sound waves, such as engine noises and/or roll noises. It is therefore possible to control the device according to the invention as a function of the operating state of the vehicle, i.e. for example to switch on the time measuring unit when the engine is switched on, without the device consequently having to be coupled to the ignition lock. It is this feature in particular which makes the device vehicle-independent and permits problem-free subsequent installation and removal of the device.

The storage of the acceleration values over time permits an analysis of the driver's behavior. From the stored values, it is possible to determine whether the driver has accelerated or braked particularly strongly over the measurement period, whether he has taken curves at very high speed, etc. These values can be compared with an average diagram in order to be able to evaluate the driver's behavior.

If only acceleration values above a certain level are to be measured, it is expedient if a component threshold circuit is arranged between the LF output of the particular acceleration sensor and the adder, said circuit passing on to the adder only an LF component which exceeds the threshold value specified for the particular acceleration component.

In order as far as possible to prevent the time measuring unit being switched on, and hence the device started up, by vibrations or noises not emanating from the vehicle, the control unit can comprise a main switch controlling the time measuring unit and a second threshold circuit which is connected to the HF outputs of the signal dividers and switches on the main switch when the HF component of at least one of the two acceleration signals exceeds the specified threshold value. Even greater security against extraneous influences is achieved if the second threshold circuit is down-circuit of a first time unit which switches off the main switch when the HF component of both acceleration signals remains below the threshold value of the second threshold circuit for a specified first period of time. On the one hand, this makes it possible to reduce the threshold value to such an extent that the device switches on even in the case of a vehicle rolling with relatively little vibration; on the other hand, a distinction is thus made between continuous operation of the vehicle and brief extraneous influences.

Switching of the device or of the time measuring unit can also be made dependent on the measured acceleration values exceeding a certain threshold value. Thus, the control unit can comprise a third threshold circuit connected to the LF outputs of the signal dividers and a second time unit which is down-circuit of said threshold circuit and switches off the main switch when the LF component of both acceleration signals remain below the threshold value of the third threshold circuit for a specified second period of time.

When the device is retrofitted, in particular if it is to be a device which can also be installed by laymen, there is a danger that the device will not be installed with the measuring axes of the acceleration sensors sufficiently precise to ensure a correct or optimal procedure. For this reason it is proposed according to the present invention that the evaluation unit 10 comprise a circuit which includes a calculation unit 52 having inputs connected to the LF outputs of the signal dividers. It determines the type of acceleration signal components received from the LF signal components. Further, a switch or switching means 42, 44 is disposed in the LF signal path between each of the acceleration sensors 16, 18 and the adder 48, wherein each on the switches 42, 44 connects ultimately to the inputs of the adder via respective threshold circuits 46, 50, and each of which is correlated with a certain acceleration component of the signal from the associated acceleration sensor, independent of the output of the calculation unit. It is therefore possible to calculate from the signal curve whether the signal represents a transverse acceleration or a longitudinal acceleration by the motor vehicle. The calculation unit can thus determine which sensor of the installed device delivers the data on the transverse acceleration and which delivers the data on the longitudinal acceleration. Accordingly, the sensors can be connected via the switching means to the adder in order to ensure correct operation of the device. One proviso is that the sensors can each respond to both types of acceleration.

In order to be able to perform a simple evaluation of the determined data, it is expedient if the device according to the invention comprises a display apparatus on which the acceleration data stored in the storage unit can be displayed in the form of a graph of the acceleration values against time.

Further features and advantages are evident from the following description which, in conjunction with the attached drawings, explains the invention with reference to the embodiment.

Figure 2:
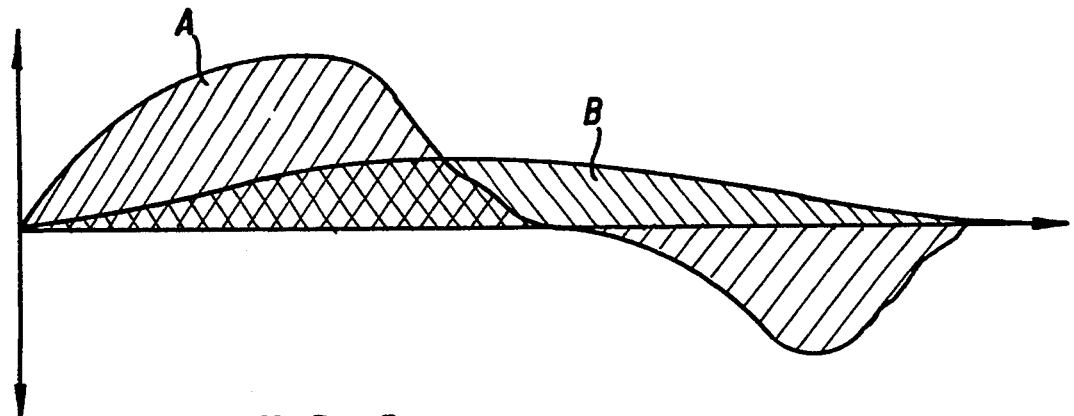
Figure 3:
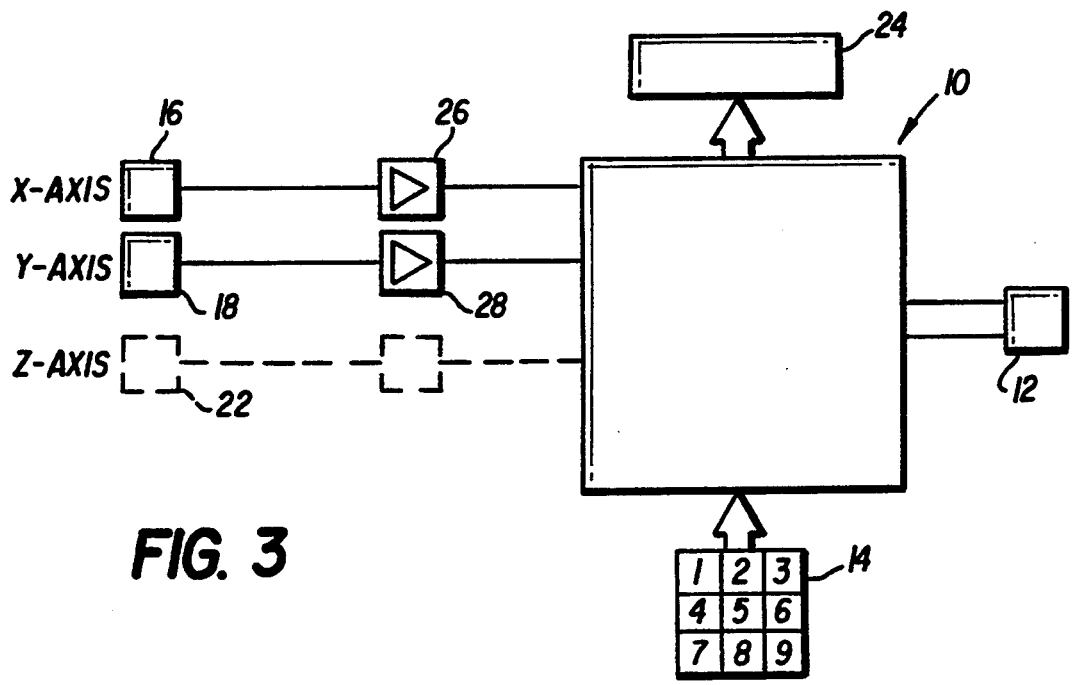

FIG. 1 shows a schematic representation of the acceleration measurement axes in a vehicle, FIG. 2 shows a graphical representation of the acceleration curve as a function of time, determined by the device according to the invention, FIG. 3 shows a block diagram of the device according to the invention and FIG. 4 shows a detailed function diagram of the device according to the invention.

According to FIG. 3, the device according to the invention comprises a microprocessor 10 which is supplied power via a battery 12. Selectable operating data, such as, for example, the threshold values to be explained below, can be input into the microprocessor via a keyboard 14. Furthermore, the microprocessor is connected to two acceleration sensors 16 and 18. The measurement axis of the acceleration sensor 16 is aligned parallel with the longitudinal axis of the vehicle on installation of the device in a vehicle 20 (FIG. 1) and thus measures a longitudinal acceleration. A measurement axis of the acceleration sensor 18 is aligned at right angles thereto and thus measures the transverse acceleration of the vehicle 20. If necessary, a third acceleration sensor 22 whose measurement axis is aligned parallel to the Z or vertical axis can also be provided. However, since this sensor is not usually required in motor vehicles, it is only indicated by a dashed line in FIG. 3.

The microprocessor 10 evaluates the signals supplied by the sensor 16, 18, 22 and drives a display apparatus 24 on which the determined acceleration values are plotted against the measuring time, for example in a graph according to FIG. 2 (curve A in FIG. 2). For this purpose, for example, a reference value (curve B) may also be displayed. This permits visual comparison of the actual values with a conventional reference value and hence an evaluation of the driver's behavior compared with average driving behavior.

The function of the device according to the invention will now be explained in detail below with reference to the detailed block diagram of FIG. 4. Identical parts are once again provided with identical reference symbols. The diagram shows an arrangement having two acceleration sensors.

Each of the sensors 16 and 18 is connected to the microprocessor 10 via an adapter or an interface 26, 28. A signal 30 or 32 which essentially consists of two filter circuits and an LF output 34 or 36 for a low-frequency signal component and an HF output 38 or 40 for a high-frequency signal component is located following each sensor 16 or 18. For example, the range from 0 to 10 Hz is designated as low frequency and the range from about 20 to 500 Hz as high frequency. The low-frequency spectrum picks up the vehicle's acceleration signals which are influenced by the driver, i.e. accelerations of the vehicle, braking of the vehicle and driving around curves. The HF component signal contains vibrations of the vehicle, such as engine vibrations, rolling noises, unevenness of the road surface, etc. As will be explained, this frequency component serves for controlling the device.

The LF outputs 34 and 36 of the two signal dividers 30 and 32, respectively, are each connected to a switching means 42 or 44, respectively, as well as calculation unit 52. The switching means 42 is connected via a component threshold circuit 46 for the X (longitudinal acceleration) component to an adder 48. The switching means 44 is connected via a component threshold circuit 50 for the Y (transverse acceleration) component to a further input of the adder 48. In the embodiment shown, the switching means 42 and 44 are represented so that the sensor 16 is connected to component threshold circuit 46 and the sensor 18 is connected to component threshold circuit 50. When the two switching means 42 and 44 are switched to their other switching position, these LF/HF signal connections are interchanged. Switching means 42 and 44 switch are under the control of a calculation unit 52. Calculation unit 52 likewise connected to the LF outputs 34 and 36 ahead of switches 42, 44 and thus determines, from the signals delivered, which type of acceleration is being detected by the sensors 16 and 18. Depending on the alignment of the measurement axes of the sensors 16 and 18, the latter are then connected via the switching means 42 and 44 to the component threshold circuit 46 or 50 belonging to them.

The HF outputs 38 and 40 of the signal dividers 30 and 32, respectively, are connected to another threshold circuit 54 which specifies a certain threshold value for the HF signal to be processed. If this threshold value is reached or exceeded, the threshold circuit 54 operates a main switch 56, which is thus closed and hence makes a connection between the system pulse generator 58 of the microprocessor 10 and an operating time counter 60, i.e. switches on the latter. The threshold circuit 54 controls a further switch 62 in such a way that, when the HF signal of the sensors 16 and 18 falls below the specified threshold value of the threshold circuit 54, a timer unit 64 is set and, after expiry of its time (for example 10 seconds), the main switch 56 is opened, i.e. the operating time counter 60 is switched off.

The LF outputs 34 and 36 of the signal divider circuits 30 and 32, respectively, are furthermore connected to a third threshold circuit 66 which specifies a threshold value for the acceleration signals. If the acceleration signals fall below this specified threshold value, the threshold circuit 66 causes a further timer unit 70 to be set via a switch 68. After the expiry of the timer set on this time unit 70 (for example, about 5 minutes), the switch 56 is opened, with the result that the operating time counter 60 is switched off.

The device described so far operates as follows: When the engine is switched on vibrations are produced which are expressed in an HF component of the signal supplied by the sensors 16 and 18. If these vibrations exceed a value specified in the threshold circuit 54, the switch 56 is closed and the operating time counter 60 switched on. If no acceleration values which exceed the threshold value set in the threshold circuit 66 occur in the time set on time unit 70 (because, for example, the vehicle is stationary), the operating time counter 60 is switched off again. If, on the other hand, the vehicle moves and the acceleration values supplied by the sensor 16 exceed the value set in component threshold circuit 46, this value is supplied to the adder 48. The same applies for the acceleration values supplied by the sensor 18. The acceleration values are vectorially added by the adder 48. The total acceleration value thus determined is passed to the display unit 24. The display unit 24 contains a store in which the acceleration values determined are stored together with the time values determined by the operating time counter 60. Furthermore, the display unit 24 provides a graphical representation in which the acceleration values are plotted against the elapsed time, according to the diagram in FIG. 2.

In addition to, or instead of, the graphical representation in the display unit, it is possible to provide for the microprocessor to calculate from the comparison of the curves A and B a number of points which gives an evaluation of the driver's behavior.

It is also possible to ensure that the mean value of the signals supplied by the sensors are continuously recalculated in the microprocessor in order to be able to eliminate influences of temperature and aging on the sensors in this way. It is also possible to calculate slopes and gradients so that, for example, only the acceleration values which can be influenced by the driver are registered and recorded, even in mountainous journeys.

If the vibrations originating from the engine of the vehicle and from the rolling noises are too weak to be detected by the acceleration sensors, the HF signal required for control should also be generated by a microphone.

We claim:

1. An apparatus for determining running variables in a motor vehicle, comprising:
    respective sensors to detect longitudinal and transverse acceleration of the motor vehicle and to generate corresponding sensor signals, each sensor having a signal output, and
    an evaluation circuit with:
        a resettable time measuring unit comprising an operating time counter which determines calculated acceleration values from the respective sensor signals over a period of time,
        a signal divider connected to the signal output of each respective acceleration sensor to separate from the particular sensor signal a low-frequency signal component output characterizing the vehicle acceleration and a high-frequency signal component output,
        an adder connected to the respective low-frequency output of each of the signal dividers for the vectorial addition of the low-frequency components of each of the signals corresponding respectively to each one of a longitudinal acceleration component (X) and a transverse acceleration component (Y),
        a storage unit connected to the adder and to the time measuring unit to store the calculated acceleration values over the measured time, and
        a control unit connected to the high-frequency output of each of the signal dividers to control the time measuring unit.

2. An apparatus as in claim 1, further including a component threshold circuit which transmits to the adder only a low-frequency signal component which exceeds a threshold value predetermined for the particular acceleration component (X, Y) and which is connected between the respective acceleration sensor low-frequency output and the adder.

3. An apparatus as in claim 2, further including an evaluation unit, wherein the evaluation unit includes a calculation unit which is connected to the low-frequency outputs of the respective signal dividers and determines the type of acceleration signals from the low-frequency signal components, and wherein a switching means which connects the adder inputs allocated to a certain acceleration component to the associated acceleration sensors depending on the result determined by the calculation unit is connected between the acceleration sensors and the adder.

4. An apparatus as in claim 2, wherein the control unit includes a main switch controlling the time measuring unit and a second threshold circuit which is connected to the high-frequency outputs of the respective signal dividers, and switches on the main switch when the high-frequency signal component of at least one of the two acceleration signals exceeds a predetermined threshold value.

5. An apparatus as in claim 3, which includes a display device for showing acceleration curves over time, stored in the storage unit.

6. A apparatus as in claim 4, wherein the control unit includes a third threshold circuit connected to the low-frequency outputs of the respective signal dividers, and a second switching unit which is connected following said third threshold circuit and switches off the main switch when the low-frequency signal component of both acceleration signals remains below the threshold value of the third threshold circuit for a predetermined second period of time.

7. An apparatus as in claim 4, further including an evaluation unit, wherein the evaluation unit includes a calculation unit which is connected to the low-frequency outputs of the respective signal dividers and determines the type of acceleration signals from the low-frequency signal components, and wherein a switching means which connects the adder inputs allocated to a certain acceleration component to the associated acceleration sensors depending on the result determined by the calculation unit is connected between the acceleration sensors and the adder.

8. An apparatus as in claim 4, further including a first time measuring unit, wherein the first time measuring unit which switches off the main switch for a predetermined first period of time when the high-frequency signal component of both acceleration signals remains below the threshold value of the second threshold circuit, and the first time measuring unit is connected following the second threshold circuit.

9. An apparatus as in claim 4, which includes a display device for showing acceleration curves over time, stored in the storage unit.

10. An apparatus as in claim 4, further including an evaluation unit, wherein the evaluation unit includes a calculation unit which is connected to the low-frequency outputs of the respective signal dividers and determines the type of acceleration signals from the low-frequency signal components, and wherein a switching means which connects the adder inputs allocated to a certain acceleration component to the associated acceleration sensors depending on the result determined by the calculation unit is connected between the acceleration sensors and the adder.

11. An apparatus as in claim 8, wherein the control unit includes a third threshold circuit connected to the low-frequency outputs of the respective signal dividers, and a second switching unit which is connected following said third threshold circuit and switches off the main switch when the low-frequency signal component of both acceleration signals remains below the threshold value of the third threshold circuit for a predetermined second period of time.

12. An apparatus as in claim 5, which includes a display device for showing acceleration curves over time, stored in the storage unit.

13. An apparatus as in claim 2, which includes a display device for showing acceleration curves over time, stored in the storage unit.

14. An apparatus as in claim 1, further including an evaluation unit, wherein the evaluation unit includes a calculation unit which is connected to the low-frequency outputs of the respective signal dividers and determines the type of acceleration signals from the low-frequency signal components, and wherein a switching means which connects the adder inputs allocated to a certain acceleration component to the associated acceleration sensors depending on the result determined by the calculation unit is connected between the acceleration sensors and the adder.

15. An apparatus as in claim 6, which includes a display device for showing acceleration curves over time, stored in the storage unit.

16. An apparatus as in claim 1, which includes a display device for showing acceleration curves over time, stored in the storage unit.

17. An apparatus as in claim 1, wherein the control unit includes a main switch controlling the time measuring unit and a second threshold circuit which is connected to the high-frequency outputs of the respective signal dividers, and switches on the main switch when the high-frequency signal component of at least one of the two acceleration signals exceeds a predetermined threshold value.

18. An apparatus as in claim 1, further including a Z-axis acceleration sensor to detect Z-axis acceleration of the motor vehicle and to generate a corresponding sensor signal output, a divider connected to said Z-axis output to separate therefrom a low-frequency component output characterizing the vehicle Z-axis acceleration which is connected to the adder, and a high-frequency signal component output connected to the control unit.

* * * * *